(12) United States Patent
Thompson et al.

(10) Patent No.: US 8,876,560 B2
(45) Date of Patent: Nov. 4, 2014

(54) STACKABLE CABLE REEL WITH FIELD DATA DISTRIBUTION SYSTEM

(71) Applicants: Alvin Dean Thompson, St. Joseph, MO (US); Cecil Donald Comley, Kansas City, MO (US); John Jeffrey Comley, Liberty, MO (US); James Michael Comley, Liberty, MO (US)

(72) Inventors: Alvin Dean Thompson, St. Joseph, MO (US); Cecil Donald Comley, Kansas City, MO (US); John Jeffrey Comley, Liberty, MO (US); James Michael Comley, Liberty, MO (US)

(73) Assignee: DT Search and Designs, LLC, St. Joseph, MO (US)

( * ) Notice: Subject to any disclaimer, the term of this patent is extended or adjusted under 35 U.S.C. 154(b) by 94 days.

(21) Appl. No.: 13/624,209

(22) Filed: Sep. 21, 2012

(65) Prior Publication Data

US 2013/0076217 A1   Mar. 28, 2013

Related U.S. Application Data

(60) Provisional application No. 61/538,208, filed on Sep. 23, 2011.

(51) Int. Cl.
*H01R 9/22* (2006.01)
*B65H 75/14* (2006.01)
*H02G 11/02* (2006.01)

(52) U.S. Cl.
CPC .......... *B65H 75/14* (2013.01); *B65H 2701/534* (2013.01); *B65H 2701/34* (2013.01); *H02G 11/02* (2013.01)
USPC ......................................... 439/709; 191/12.4

(58) Field of Classification Search
CPC ...... H01R 4/2433; H01R 13/72; H01R 31/09; H01R 25/006; H02G 11/02
USPC ................. 439/404, 409, 501, 502, 535, 709; 191/12.4
See application file for complete search history.

(56) References Cited

U.S. PATENT DOCUMENTS

| | | | |
|---|---|---|---|
| 2,372,083 A | | 3/1945 | Johansson et al. |
| 3,040,139 A | | 6/1962 | Appleton |
| 4,083,621 A | * | 4/1978 | Davidson et al. ............. 439/501 |
| 4,138,177 A | * | 2/1979 | Van Valer .......................... 439/4 |
| 4,602,752 A | | 7/1986 | Nimke et al. |
| 5,611,710 A | | 3/1997 | Essrich |
| 5,641,312 A | | 6/1997 | Bippus et al. |
| 5,700,150 A | * | 12/1997 | Morin ............................... 439/4 |
| 6,113,421 A | | 9/2000 | Daoud |
| 6,159,036 A | | 12/2000 | Daoud |
| 6,350,144 B1 | | 2/2002 | Afflerbaugh et al. |
| 6,608,255 B1 | | 8/2003 | Donner et al. |
| 6,764,356 B2 | | 7/2004 | Becher et al. |
| 6,780,044 B1 | | 8/2004 | Sawyer et al. |
| 6,875,928 B1 | | 4/2005 | Hayes et al. |
| 6,942,079 B2 | * | 9/2005 | Chang .......................... 191/12.4 |
| 7,097,516 B2 | | 8/2006 | Werner et al. |

(Continued)

*Primary Examiner* — Thanh Tam Le
(74) *Attorney, Agent, or Firm* — Erickson Kernell Derusseau & Kleypas, LLC

(57) ABSTRACT

A cable reel assembly comprises a hub configured to house a field communication distribution box with front and rear flanges projecting radially outward from front and rear edges of the hub. A cable receiving trough is formed between the flanges in which a communications cable may be wound. A nesting ring which is smaller in diameter that the front and rear flanges projects outward from the second flange. The nesting ring of a first cable reel assembly is positionable within an area surrounded by the first flange of a second cable reel to facilitate stacking of the cable reels.

16 Claims, 17 Drawing Sheets

(56) References Cited

U.S. PATENT DOCUMENTS

| | | | |
|---|---|---|---|
| 7,238,063 B2 | 7/2007 | Thompson | |
| 7,270,293 B1 * | 9/2007 | Karoly | 242/598.3 |
| 7,399,927 B2 | 7/2008 | Glew | |
| 7,438,258 B2 * | 10/2008 | Chen | 242/614 |
| 7,445,520 B2 | 11/2008 | Thompson | |
| 7,465,879 B2 | 12/2008 | Glew | |
| 7,625,248 B2 | 12/2009 | Thompson | |
| 7,625,249 B2 | 12/2009 | Thompson | |
| 7,628,659 B2 | 12/2009 | Thompson | |
| 7,984,798 B1 * | 7/2011 | Hall | 191/12 R |
| 8,016,617 B2 * | 9/2011 | Neumetzler | 439/620.08 |
| 8,210,883 B2 * | 7/2012 | Dennes | 439/709 |
| 8,262,404 B2 * | 9/2012 | Neumetzler et al. | 439/404 |
| 8,512,067 B2 * | 8/2013 | Denter et al. | 439/403 |
| 2004/0087207 A1 | 5/2004 | Lerch | |
| 2005/0236243 A1 | 10/2005 | Huang | |
| 2009/0181582 A1 | 7/2009 | Thompson | |

* cited by examiner

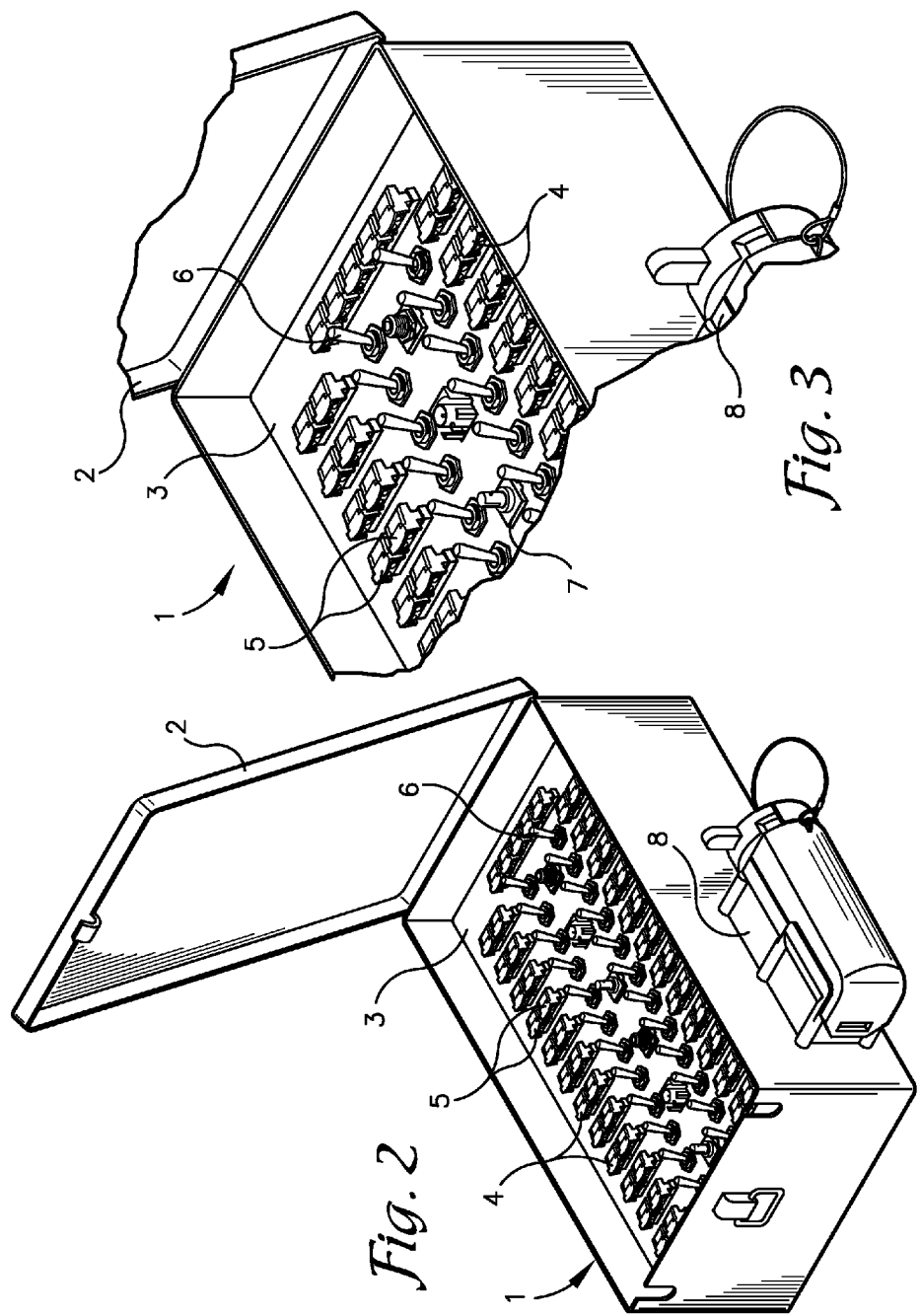

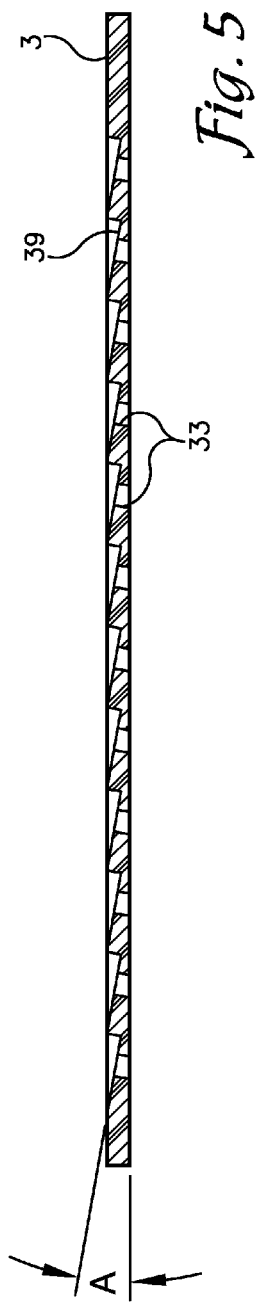
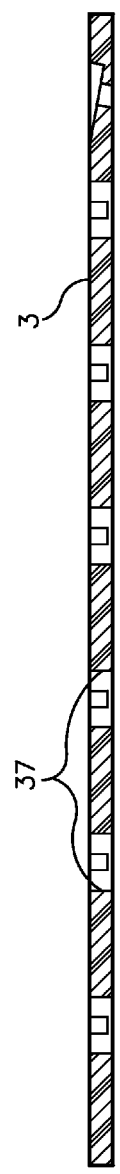
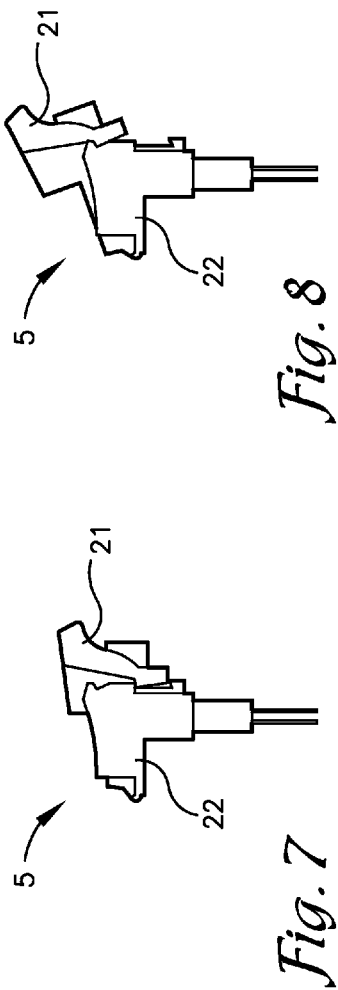
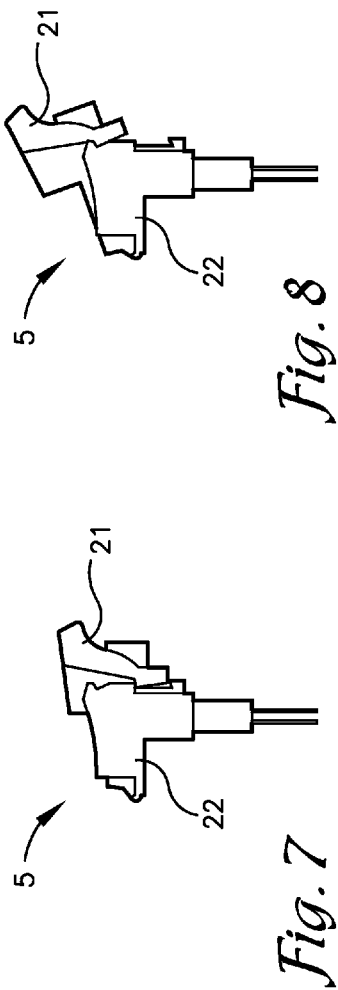

STACKABLE CABLE REEL WITH FIELD DATA DISTRIBUTION SYSTEM

CROSS-REFERENCE TO RELATED APPLICATIONS

This application claims the benefit of U.S. provisional patent application Ser. No. 61/538,208, filed Sep. 23, 2011, under 35 U.S.C. §119(e).

BACKGROUND

The present invention relates to field communication distribution equipment, cables for such equipment to increase data throughput of such cables without increasing crosstalk and other interference, and a stackable cable reel for housing, carrying, storing, and transporting the communication distribution equipment and cables.

The J-1077 A/U distribution box (hereinafter referred to simply as the "J-1077") is used to interconnect military field telephones and other communication devices in mobile, transportable, and semi-permanent installations. The J-1077 has provisions for connection of one or two 26 conductor-pair cables to a set of 26 pairs of spring post connectors mounted on a panel within the box. The standard cable for use with J-1077 type boxes is designated CX-4566 A/G. As such, the J-1077 can interconnect two 26-pair cables or can terminate a single 26-pair cable and provide connections to the conductors within the cable, such as for telephone sets or test equipment. The J-1077 has been in use for several decades and has proved to be generally rugged and reliable in varied field conditions. Additional information about the J-1077 distribution box can be obtained from Associated Industries of North Hollywood, Calif. (www.associated-ind.com) and from other sources.

Although generally successful, the J-1077 has some shortcomings. The configuration of the spring post connectors requires that wires be stripped before insertion into the posts. Stripping sometimes damages some of the strands of a conductor, causing them to break off, thereby reducing the signal carrying capability of the conductor. Stripping is also time-consuming if a large number of connections need to be made at one time.

The J-1077 distribution box and the standard CX-4566 A/G cable were originally designed for carrying multiple channels of audio frequency telephone signals. As stated above, military field communications have evolved beyond voice and teletype communications to high speed data communications for text, numeric, and image data in addition to voice signals. United States military services also make use of an expanded field distribution box or signal distribution panel designated as the J-2317 A/U box (referred to hereinafter simply as the J-2317 box) which has the interconnection capabilities of four J-1077 boxes. The conventional J-2317 box includes four 26-pair cable connectors, designated as connectors A, B, C, and D. Each cable connector terminates at a respective set of binding posts to enable patching of communication devices to 26-pair cables connected to the cable connectors.

Some types of military communication equipment have optical data signal interfaces which utilize optical fiber communication media. Optical data signals have a number of advantages in military applications, including high efficiency over long distances, high data rates, difficulty of tapping by an enemy, and the like. There is also a need for converting signals carried by optical fiber media to electrical data signals for carriage by conventional copper based cables.

A number of shortcomings for the J-1077 and J-2317 boxes have been remedied by the communication equipment disclosed in co-owned U.S. Pat. No. 7,238,063, U.S. Pat. No. 7,445,520, U.S. Pat. No. 7,625,248, U.S. Pat. No. 7,625,249, and U.S. Pat. No. 7,628,659; the entire contents of which patents are incorporated herein by reference. Despite the improvements to the communication equipment disclosed in these patents, the distribution box itself retains a generally rectangular overall shape with a hinged door or lid. The box is used in association with a cable that is transported and stored on a reel. Both boxes and reels are transported by stacking in a vehicle or the like. While the shape of the boxes provides reasonably stability during transport, the reels tend to slide off the stack and roll around. Because of the bulk and configurations of the equipment, two persons are generally required to load/unload the separate items during embarking and debarking. There remains, therefore, a need for an improved cable reel that is lighter in weight, stackable, and easy to handle and reel. In addition, there remains a need for a cable reel that incorporates the improved field communication distribution equipment into a single unit that may be transported and deployed by a single person.

SUMMARY

The present invention provides an enhanced cable reel apparatus for field data distribution systems. In particular, the present invention provides embodiments of storing and transporting cables for interconnection with J-1077 type distribution boxes which have been upgraded for carrying computer network signals, such as Ethernet type signals.

Embodiments of the present disclosure relate to a stackable cable reel for carrying, storing, and transporting the distribution equipment and cables. In one embodiment, the cable reel apparatus includes front and rear flanges affixed to a central reel body. The cable reel apparatus also includes a smaller diameter flange that extends from the rear of the central reel body that enables two or more cable reel apparatuses to be interlocked together. This interlocking feature allows for a very stable stack of multiple cable reel apparatuses.

In one embodiment, the cable reel apparatus is suitable for transporting and using Cat 5E Ethernet wire with a modified J-1077 box positioned at the center of the reel. Thus, embarking and debarking soldiers will only have to carry one apparatus instead of a separate box and cable reel. The cable reel apparatus may also include a stand to support the reel and the apparatus. Moreover, the cable reel apparatus and/or stand may be configured for rolling to aid in transporting the cable reel apparatus.

In order to provide for digital communications between computers and computerized equipment, the improved J-1077 type distribution box incorporated into the cable reel apparatus of the present invention may have some of the insulation displacement connectors interconnected to connectors more appropriate for computer networks or for interconnections between modems. Such connectors can include, but are not limited to, RJ-45 (8P8C), RJ-11, and RJ-12 modular type connectors; BNC type connectors; and other connectors commonly employed for interconnections between computers. Conductors of the cables interconnecting the improved J-1077 boxes and carrying data between computers may be shielded separately from the other conductor pairs to minimize possible interference to and from other signals on other conductor pairs. Data connectors and associated cable conductors would provide some limited computer networking capabilities in addition to more conventional analog voice communications in systems employing J-1077 type distribution boxes. Alternatively, other types of connectors can be connected to selected insulation displacement connectors, such as standard phone connectors, F-type connectors, fiber optic adapters, and other standard types of network, telephone, audio, video, and signal connectors. The insulation displacement connectors and the auxiliary connectors are connected to a pair of box connectors positioned on opposite sides of the box to enable the distribution box to be connected to other boxes. The box connectors have sets of contacts which correspond to the conductors of the insulation displacement connectors and the auxiliary connectors. A preferred type of box connector is designated U-187 A/G which is referred to as a side mount connector in which a side of the box connector structure is joined to the side wall of the box. It is foreseen that the box connector could alternatively be a U-186 C/G connector which is substantially similar to the U-187 A/G except that the U-186 C/G connector is joined to a side wall of the box by an end of the connector structure.

An embodiment of the distribution box incorporated into the cable reel apparatus of the present invention is provided with a media converter for converting between optical data signals and electrical data signals. A standard type of fiber optic connector is provided on the connector along with a standard type of electrical data connector. The fiber optic connector may, for example, be an ST type of optical connector while the electrical connector is an RJ-45 connector. Media converter circuitry is interfaced to the optical and electrical data connectors and bilaterally converts between a standard optical data format and a standard electrical data format. The formats may, for example be 1000Base-SX for the optical data format and 1000Base-T for the electrical data format. Electrical power for operation of the media converter circuitry may be provided by a transformer and rectifier unit connected to a power strip or generator, a battery of an appropriate size, or the like.

The cable reel apparatus includes an embodiment of an improved distribution box which combines the optical data conversion capabilities of the previously described embodiment to the expanded interconnection capabilities of a field distribution panel or box similar to in many respects to the J-2317 field distribution box. The distribution box includes a plurality of interconnection groups, such as four interconnection groups. Each interconnection group includes a multiple terminal box connector, such as a standard connector having 26 pairs of conductors/terminals. The pairs of terminals of the box connector are connected to corresponding pairs of terminals of insulation displacement connectors mounted in sets on a panel of the box. The terminals of the most of the insulation displacement connectors are connected to terminals of standardized auxiliary connectors mounted in sets on the panel of the box. The auxiliary connectors may be any of a number of types of standardized connectors to facilitate the connection of standard types of communication devices to the distribution box. In an embodiment of the present invention, the terminal pairs of 24 of the insulation displacement connectors are connected in pairs (four conductors) to a set of twelve standard RJ-45 connectors.

Each interconnection group includes media converter circuit or circuitry for converting between optical data signals and electrical data signals. A separate converter RJ-45 connector is provided for the electrical data signal and connects to an electrical port of the media converter circuit. A standard type of optical connector, such as an ST type of optical connector, is interfaced to an optical port of the media converter circuit. A power jack is connected to a power input of the media converter circuit to provide DC operating power therefore. The DC power may also be made available to a conductor pair of the cable, such as through the $25^{th}$ conductor pair of the cable and box connector. The DC power may be provided by a transformer/rectifier unit connected to an AC line of a power strip or generator, a battery of an appropriate voltage and ampere-hour capacity, or the like. The converter RJ-45 connector is not connected directly to conductors of the box connector. However, a patch cord can be used to connect the converter RJ-45 connector to one of the RJ-45 connectors to provide electrical signal communication remote from the distribution box. As described above, the media converter circuit may provide a data conversion between a 1000 Base-SX optical data signal format and a 1000 Base-T electrical data signal format In one embodiment of the cable reel apparatus, an enhanced cable includes a plurality of pairs of cable conductors positioned within a conductive shield and an insulative tubular sheath. The cable may also include an outer "armor" layer which reduces damage from being chewed by animals and from other hazards. Each end of the cable includes a cable connector with a plurality of sets of contacts to which the cable conductors are connected. The cable connector is configured to be compatible with the configuration of the box connector. The conductor pairs, in cooperation with the cable connector, are configured to comply with Category 5E (Cat 5E) specifications. Cat 5E conductor pairs are typically twisted at a twist pitch of three twists per inch (2.54 cm). Preferably, the twist is maintained within the cable connector to within one-half inch (12.7 mm) of the contact terminal set to which the conductors are soldered. It is foreseen that the conductor pairs and connector could be configured to specifications more stringent than Cat 5E.

Typically, both ends of the enhanced cable will have U-185 B/G connectors which are compatible with both the U-187 A/G and U-186 C/G box connectors. The U-185 B/G connector is a "genderless" type of connector and may be connected to another U-185 B/G connector to thereby connect one cable to another cable. The cable may also be provided at one end with another type of connector, such as a standard type of multi-contact cylindrical connector designated MS-27467 or AE167, often referred to as a barrel or Cannon connector.

Various objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 2 is a perspective view of a J-1077 box with insulation displacement connector sets and test switches which embodies the present invention.

FIG. 3 is an enlarged fragmentary perspective view similar to FIG. 2 and illustrates elements the modified J-1077 box in more detail.

FIG. 5 is a longitudinal sectional view of the modified connector panel taken on line 5-5 of FIG. 4.

FIG. 6 is a longitudinal sectional view of the modified connector panel taken on line 6-6 of FIG. 4.

FIG. 7 is a greatly enlarged side elevation view of an insulation displacement connector used in the modified J-1077 distribution box of the present invention, with a top section shown in a closed position.

FIG. 8 is a view similar to FIG. 7 and illustrates the insulation displacement connector with the top section shown in an opened position.

DETAILED DESCRIPTION

Figure 1:
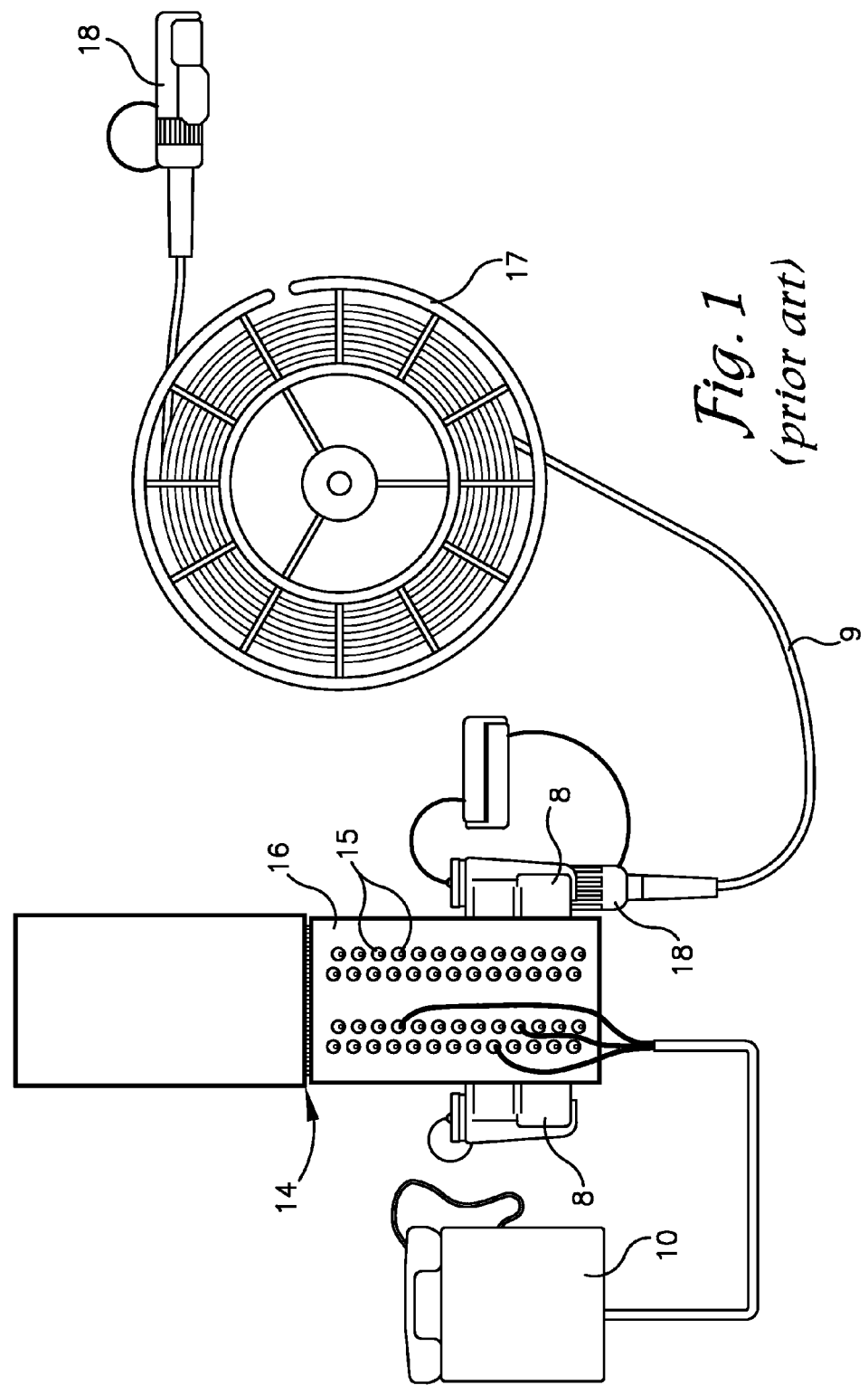
FIG. 1 is a view of a J-1077 field communication distribution box along with a cable reel and cable and a telephone set.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawing in more detail, the reference numeral 1 (FIGS. 2 and 3) generally designates an improved field communication distribution box which embodies the present invention. The box 1 generally includes an access door or lid 2 hingedly connected thereto and a connector panel 3 positioned in the box 1 and having pairs 4 of insulation displacement connectors 5, test switches 6, and auxiliary connectors 7 mounted thereon. The box 1 has box connectors 8 mounted on sides thereof to enable connection of cables 9 to the connectors 5 and 7 thereof. Conversely, the connectors 5 and 7 enable connection of communication devices 10 to the cables 9 (FIG. 1) for communication with other devices 10 (FIG. 1) connected to the cables 9.

Referring to FIG. 1, the conventional field communication distribution box 14, with the military designation J-1077 A/U ("J-1077"), has a plurality of spring post connectors 15 mounted on a panel 16. The box 14 has the capability of interconnecting a pair of the cables 9 and provides for the connection of communication devices 10, such as telephone sets, to conductor pairs in the cables 9. FIG. 1 shows a cable reel 17 on which a cable 9 is stored and from which it is paid out from one box 14 to the next. The illustrated cable 9 (designated as CX-4566 A/G) has 26 numbered pairs of conductors and terminates at each end in a multi-terminal cable connector 18 (designated as a U-185 B/G connector). The cable connectors 18 mate with one of the box connectors 8 (designated U-187 A/G connectors) to interconnect two cables 9 and to enable connections of the devices 10 to the conductors of the cables 9.

The insulation displacement connector 5 generally has a movable top section 21 which comprises two wire insertion holes and is pivotally connected to a lower fixed section 22 which houses a pair of terminal strips. The terminal strips (not shown) have a wire engaging portion at one end for engaging and making electrical contact with a wire. The terminal strips are generally parallel to one another but offset to provide a sufficient dielectric strength between them. The top movable section 21 of the connector 5 pivots about a fixed axis located toward the back side of the connector. The top section 21 has a movable latch member to maintain the top section in its closed position. To open the top section, a user pivots the top section to its raised or open position (FIG. 8). When the top section is open, the terminal strips do not intersect the wire insertion holes, and when the top section is closed (FIG. 7), the terminal strips intersect the wire insertion holes. In order to establish an electrical connection between the wires and the terminal strips a user first opens the top section, i.e., pivots the top section to its open position, inserts the pair of wires, and then closes the top section. Upon closing the top section of the connector, the wires are forced through the terminal strip engaging portion to make electrical and mechanical contact with the terminal strips. To remove the wires and/or break the electrical connection, the process is reversed. A preferred type of insulation displacement connector 5 is manufactured by Channell Commercial Corporation of Temecula, Calif. (www.channellcomm.com) and sold under the trademark Mini-Rocker. Such connectors are also sometimes referred to as Mil-Lok connectors.

Figure 9:
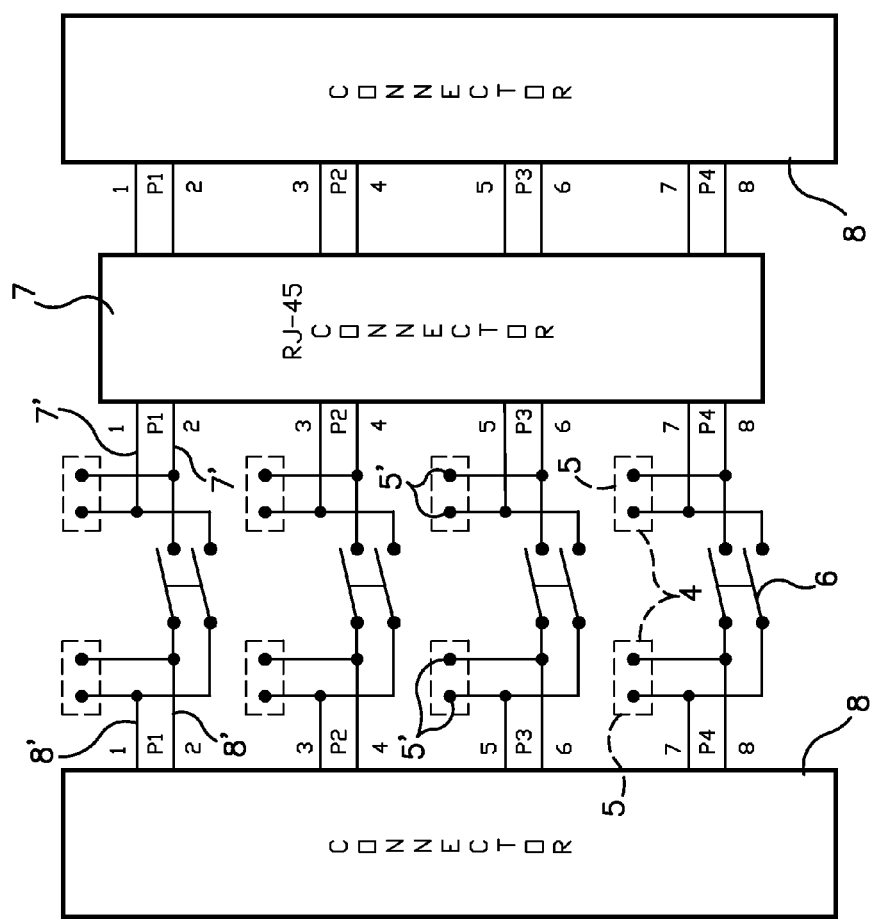
FIG. 9 is a schematic diagram illustrating test switches interconnecting terminals of pairs of insulation displacement connectors of the modified J-1077 distribution box of the present invention and further illustrates the connection of a multi-conductor connector to a plurality of pairs of the insulation displacement connectors.

Each set of spring binding posts 15 on the connector panel of the conventional J-1077 distribution box 14 is replaced by a set 4 of insulation displacement connector units or connector devices 5. The pair of connector units 5 provides for redundancy should one of the receptacles malfunction or be damaged. The insulation displacement connectors 5 enable faster and more reliable connections since the wires to be inserted do not require stripping. The terminals 5' (FIG. 9) of each connector unit 5 are connected to associated pairs of contacts or conductors 8 in the box. Referring to FIG. 9, the terminals of a first one of the pair 4 of connector units 5 are connected to the box connector 8 on one side of the box 1 while the terminals of the second of the pair 4 are connected to the box connector 8 on the opposite side of the box 1.

In order to facilitate troubleshooting to find which circuit may have a problem, it is a common practice with the older box 14 to remove a conductor from a binding post 15, one at a time, until the problem circuit is identified. Such disconnecting and reconnecting is laborious and can damage the stripped wire ends, requiring that the wire end be stripped before reconnecting. The present invention overcomes this problem by providing a test switch 6 to interconnect the sets of terminals of each pair 4 of connector units 5. A double pole, single throw switch configuration is preferred. When the switch contacts are closed, the terminals of each pair 4 are interconnected. However, when the switch contacts are opened, the conductors of cables 9 on both sides of the box 1 can be individually tested, without removing wires from the connector units 5.

The present invention provides a means of detecting the approximate location of a cut or break in one of a series of interconnected cables 9. Typically, the cables 9 are formed by 26 numbered pairs of conductors. Normally, only 25 pairs carry communication signals, while the No. 26 pair is used for testing and troubleshooting purposes.

Figure 10:
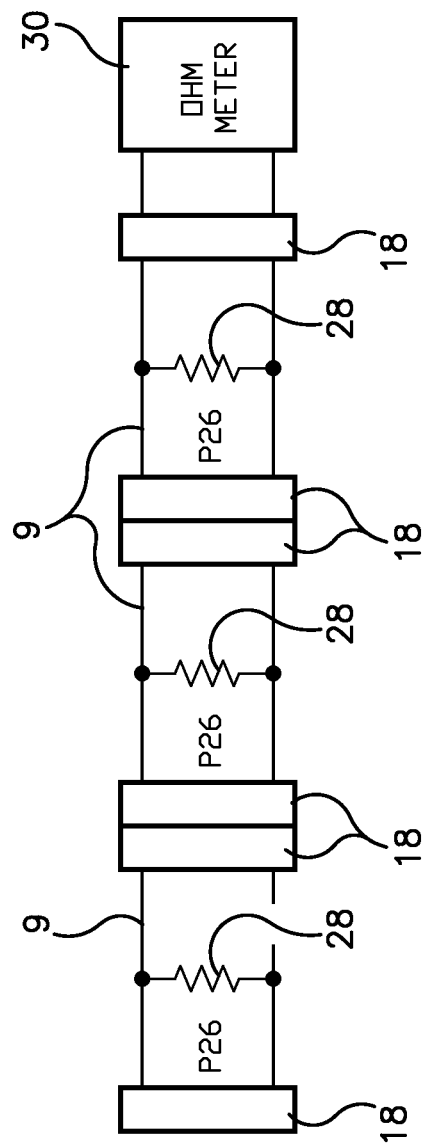
FIG. 10 is a schematic diagram illustrating a plurality of interconnected cables of the present invention with resistors to enable the location of a break in a cable.

Referring to FIG. 10, the present invention provides at least one resistor 28 per cable, connected across the No. 26 conductor pair. The value of the resistor is standardized and may range from about 1000 ohms (1 kilohm) to several hundred kilohms. A number of cables 9 are normally strung together end-to-end using boxes 10 or other kinds of appropriate connectors. Normally, a technician will be aware of the exact number of cables 9 present in a given communication network. Each cable 9 added, in the present invention, connects an additional resistor 28 in parallel; thereby further dividing the equivalent resistance of all the interconnected resistors 28. Additionally, the resistance of a given length of the conductor pair is known. The unbroken length of the composite cable is related to the equivalent resistance measured across the No. 26 conductor pair. If the value of the standard resistor is relatively high, the in-line resistance of the conductor pair is less significant in proportion to the standard resistors, such that the equivalent resistance of the cable is effectively the parallel combination of the standard resistors. Thus, the equivalent resistance of the cable is inversely proportional to the length of the composite cable.

For example, if the composite cable is formed by ten cable sections, each with a standard resistor connected across the No. 26 pair, then the equivalent resistance measured is one tenth of the value of the standard resistor. However, if ten cable sections should be present and the resistance measured by an ohm meter 30 from one end is, for example, one seventh the value of the standard resistor, then the technician knows that there is a break in the eighth section. By this means, the broken cable section can be replaced or repaired quickly and directly without the need to inspect each section. Alternatively, resistor 28 may be connected across each end of the No. 26 pair of each cable section 9. By this means, the integrity of a single cable section 9 can be determined by measuring the resistance across the No. 26 conductor pair.

The present invention also contemplates connecting a cable monitor circuit to the No. 26 cable pair which monitors the equivalent resistance of the composite cable. Such a cable monitor would preferably be based on a programmable digital computer or at least a programmable microprocessor to provide for a variety of desirable features. The number of sections and the value of the standard resistor are entered into the monitor circuit. If the monitored resistance varies by greater than a selected tolerance, an alarm is activated. The change in resistance could be a consequence of the cable being damaged or being disconnected by an enemy to insert listening equipment into the line. In either case, once the occurrence to line interruption has been alerted, the approximate location of the break can be located by the procedures described previously.

In some applications, it may be desirable to provide in-line electrical fuses (not shown) to the conductors of the cable to protect circuits and equipment connected thereto. Such fuses may be rated at relatively low levels of current, such as 375 milliamperes, because of the relatively low power levels of signals intended to be carried by the conductors of the system. The fuses protect the circuits connected thereto from damage due to short circuits, current surges, and the like. The fuses are preferably provided in such a manner that they can be easily replaced if blown.

In order to provide for digital communications between computers and computerized equipment, the improved type distribution box 1 of the present invention may have various types of auxiliary connectors 7 having auxiliary connector terminals 7' interconnected to the terminals 5' of the insulation displacement connector units 5. Such connectors can include, but are not limited to, RJ-45 (8P8C), RJ-11, and RJ-12 modular type connectors; BNC type connectors; F-type connectors, fiber optic adapters, and other connectors commonly employed for interconnections between computers, computer networks, modems, and the like. Conductors of the cables 9 interconnecting the boxes 1 and carrying data between computers may be shielded separately from the other conductor pairs to minimize possible interference to and from other signals on other conductor pairs. Data connectors and associated cable conductors would provide some limited computer networking capabilities in addition to more conventional analog voice communications in systems employing conventional J-1077 type distribution boxes.

Figure 4:
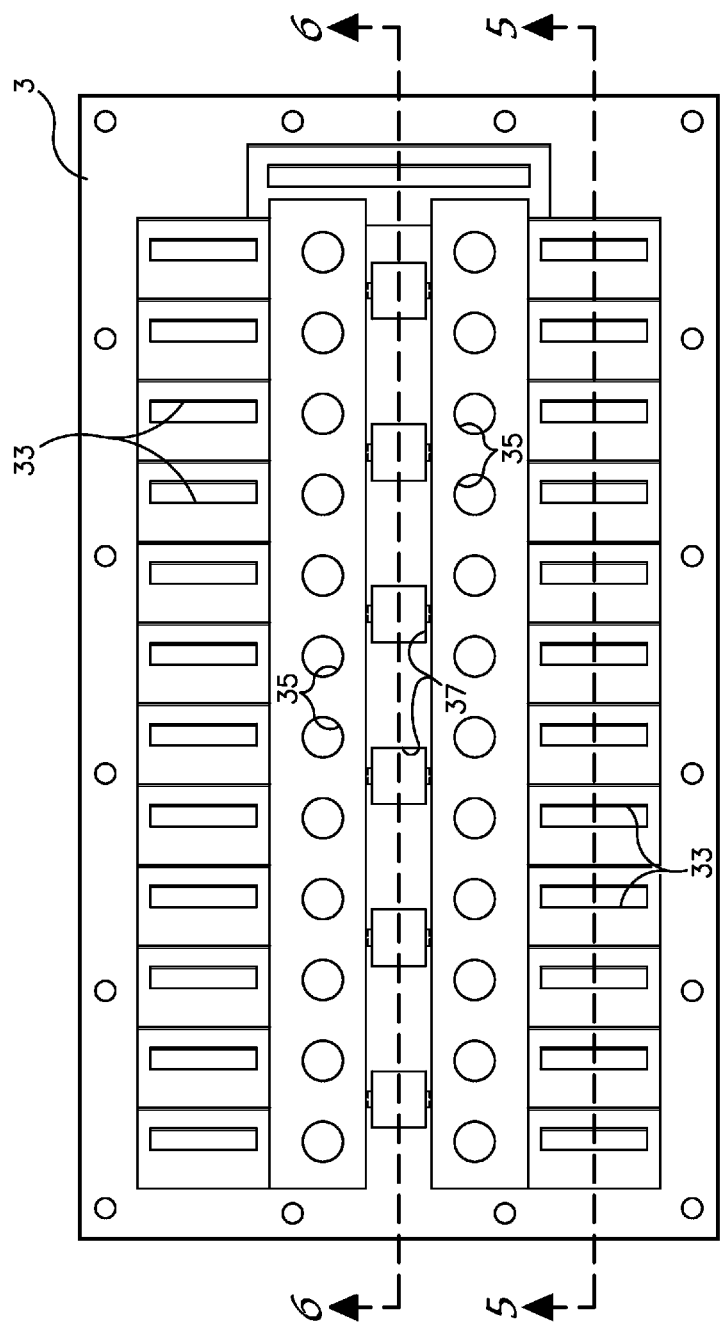
FIG. 4 is an enlarged plan view of a connector panel of the modified J-1077 box with connectors and switches removed.

FIGS. 4-6 illustrate an improved panel 3 suitable for use with the modified distribution box 1. The panel 3 includes slots 33 to receive pairs 4 of the connector units 5, circular apertures 35 to receive the test switches 6, and square openings 37 to receive the auxiliary connectors 7. As shown in FIG. 5, the panel 3 may have its surface relieved in an angular configuration around the slots 33 at 39 to position the connector units 5 at a more convenient attitude for access by a technician.

Figure 11:
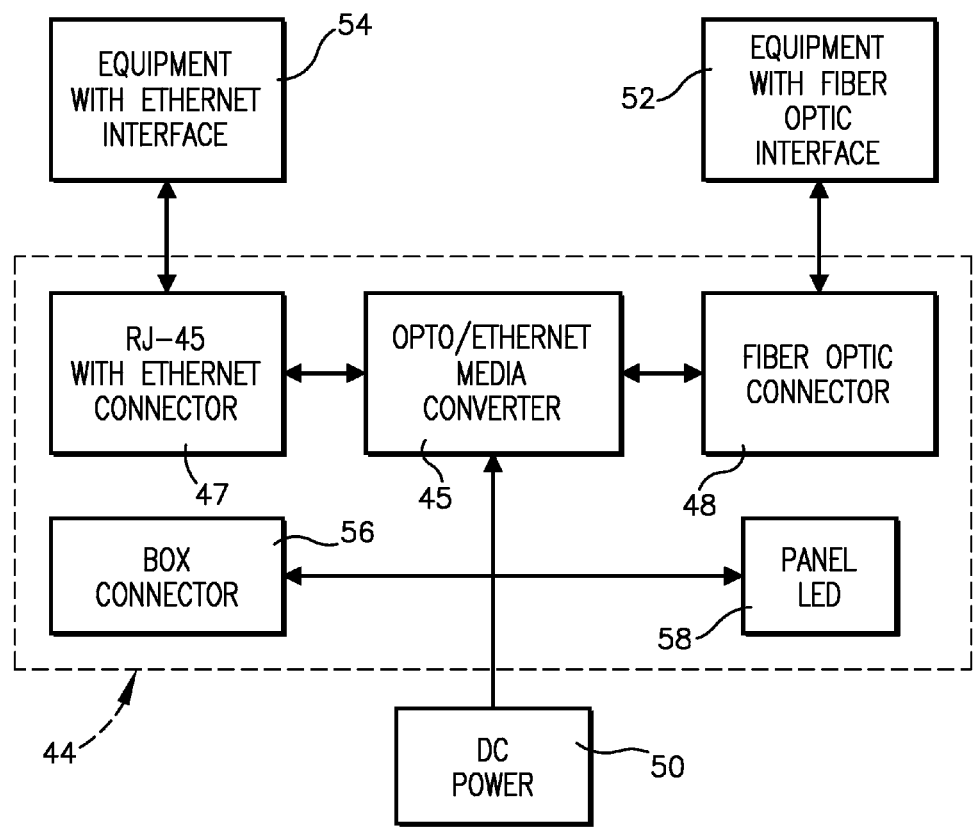
FIG. 11 is a block diagram illustrating an embodiment of a field data distribution system with a fiber optic converter according to the present invention.

FIG. 11 diagrammatically illustrates an enhanced embodiment of the distribution box 44 incorporating media converter circuitry 45 for converting data formats between an electrical data format and an optical data format. The box 44 includes auxiliary connectors 47 and 48, of which connector 47 is an electrical data connector such as an RJ-45 (8P8C) Ethernet type connector and connector 48 is an optical connector such as an ST type optical connector. In general, the media converter bilaterally or bidirectionally converts between an electrical data signal format carried by the electrical connector 47 and an optical data signal format carried by the optical connector 48. The media converter circuit 45 may, for example, be a Signamax Connectivity Systems 065-1195 unit from AESP, Inc. (www.signamax.com). It is foreseen that other types of media converter units could alternatively be employed. The illustrated media converter converts from a 1000Base-T format, a gigabit Ethernet format for a twisted pair of electrical conductors, to a 1000Base-SX format, a gigabit optical Ethernet format for carriage by an optical fiber. The illustrated media converter 45 is powered by a DC power source 50 which may be a transformer and rectifier unit plugged into a power strip or generator, a battery of the appropriate voltage, or the like. The media converter 45 allows "optical" equipment or types of equipment 52 with a fiber optic interface to communicate data with "electrical" equipment 54 having an electrical Ethernet interface and vice versa. The electrical equipment 54 can be local to the distribution box 44 or can be remote from the box 44 and connected by a cable similar to the cable 9 described above and connected to a local box connector 56, similar to the box connector 8. The box connector 56 is preferably a U-187 A/G side connector or a U-186 C/G end connector. The DC power source 50 may be connected to a panel indicator, such as an LED 58 to indicate activation of the media converter 45. The power source 50 may also be connected to the box connector 56 to provide DC power through a cable connected to the box connector 56 remote from the distribution box 44.

Figure 12:
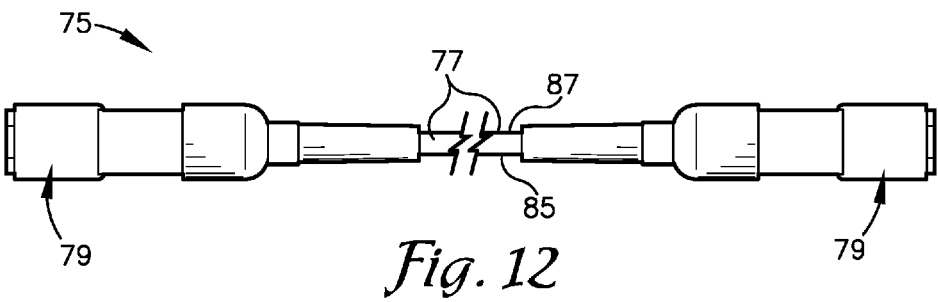
FIG. 12 is a fragmentary elevation view of an enhanced cable for a field data distribution system according to the present invention.
Figure 15:
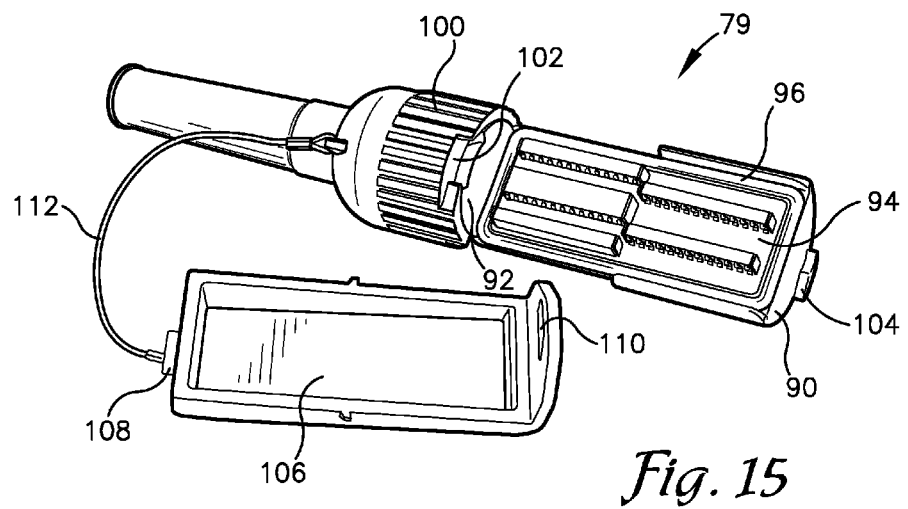
FIG. 15 is an enlarged perspective view of a U-185B/G cable connector employed with the enhanced cable.

Referring to FIG. 12, an enhanced cable assembly 75 is illustrated which is suitable for interconnecting field distribution boxes such as the enhanced distribution boxes 44, as well as the boxes 1 shown in FIG. 2. The enhanced cable assembly 75 is similar in many respects to the cable 9 of FIG. 1 which is a CX-4566 A/G cable, with differences which will be described. The illustrated cable assembly 75 includes a cable member 77 with cable connectors 79 positioned on opposite ends. The cable member or cable proper 77 includes a plurality of pairs 81 (FIG. 13) of insulated conductor members 83 which are enclosed within a conductive shield 85 and an outer insulative sheath 87. The cable member 77 may also include an outer "armor" layer (not shown) to reduce damage to the cable member 77 from contact with rough objects in the field, such as rocks, branches, exposed tree roots, and the like, being run over by vehicles, or being chewed by animals. The illustrated cable member 77 preferably includes 26 conductor pairs 81 which are twisted at a twist pitch of three twists per inch (2.54 cm). Referring to FIG. 15, the cable connector structure 79 includes a conductive shell 90 extending from a collar base 92 through which the cable member 77 extends. The shell 90 is connected to the shield 85 of the cable member 77. A contact array board assembly 94 is secured within the shell 90 and is surrounded by a resilient weather seal 96. The connector structure 79 includes a latch mechanism 98 to retain the connector 79 secured to a box connector 56 or 8 of a distribution box 44 or 1. In the illustrated connector 79, the latch mechanism 98 takes the form of a rotary or bayonet type of collar 100 surrounding the collar base 92 and having a notch 102 formed in an edge thereof. The outer end of the shell 90 is provided with a tab 104. The collar 100 and tab 104 cooperate with similar members on a box connector 56 whereby a tab of the box connector is received through the notch 102 and the tab 104 engages a notch of a collar of the box connector. The collar 100 and the box connector collar are rotated to retain the respective tabs of the cable connector 79 and the box connector 56. The latch mechanism 98 also allows two of the cable connectors 79 to be joined and retained in a joined condition in a similar manner. When the cable connector 79 is joined to a box connector 56 or another cable connector 79, the weather seals 96 thereof are mutually engaged to seal the respective connectors against the entry of moisture. The illustrated cable connector 79 includes a connector cover 106 including a tab 108 and a tab aperture 110 which respectively engage the notch 102 and tab 104 of the cable connector 79 for retention thereon. A lanyard 112 is typically provided to prevent the cover 106 from being misplaced.

Figure 13:
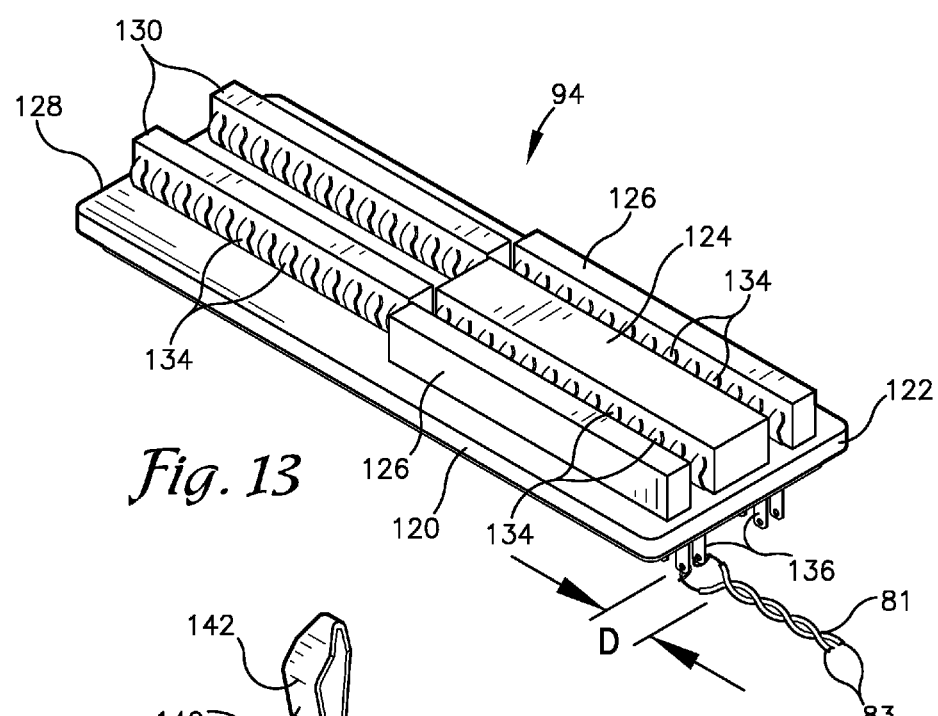
FIG. 13 is an enlarged perspective view of a contact assembly for use on the enhanced cable and on distribution boxes which the enhanced cable is employed to interconnect.
Figure 14:
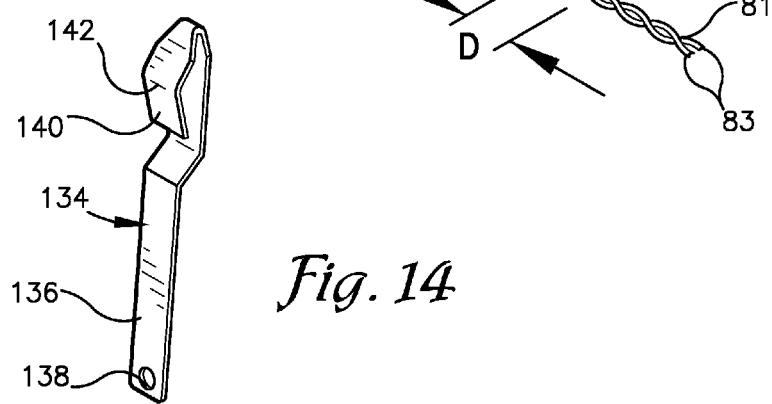
FIG. 14 is a greatly enlarged perspective view of a contact member of the contact assembly.

Referring to FIGS. 13 and 15, the contact array board assembly 94 includes a circuit board 120 with a plurality of contact support blocks positioned thereon. At an inner end 122 of the board 120, a wide center support block 124 is provided along with a pair of side support blocks 126. At an outer end 128 of the board 120, a pair of outer support blocks 130 are positioned on the assembly 94. The blocks 124, 126, and 130 are sized, shaped, and positioned so that the outer blocks 130 of one cable connector 79 or box connector 56 will fit within the spaces between the center block 124 and the side blocks 126 of another connector. The cable connectors 79 and box connectors 56 are, thus, genderless whereby any cable connector 79 can connect to a box connector 56 or another cable connector 79. The illustrated contact array board assembly 94 conforms to the specifications of the assembly having the standard designation of MX-3227/G. The illustrated cable connector 79 with the illustrated contact array board assembly 94 conforms to the type of standard cable connector designated as U-185 B/G.

The circuit board 120 and support blocks 124, 126, and 130 support a plurality of conductive contact members 134. Each contact member 134 includes a straight solder lug 136 with means such as an aperture 138 to receive a stripped end of a conductor 83 of a conductor pair 81. At an end opposite the aperture 138, a resilient contact pad 140 is formed. The illustrated contact pad 140 has a wide V-shaped ridge 142. When a cable connector 79 is joined with a box connector 56 or another cable connector 79, the ridges 142 of mutually engaging contacts 134 snap past one another to help retain the connectors together. The circuit board 120 is preferably a multi-layer circuit board with one or more internal ground plane layers (not shown) to form a shield in cooperation with the conductive shell 94. The solder lugs 136 of the contact members 134 extend through holes (not shown) in the circuit board 120 and are retained therein against the support blocks 124, 126, and 130. Each contact member 134 corresponds to a conductor 83. Each contact member 134 is replicated at opposite ends of the assembly 94 with internal traces (not shown) interconnecting the pairs of contacts 134. The patterns of contact members 134 at opposite ends of the contact array board assembly 94 are mirror images of one another so that when a cable connector 79 is connected to another cable connector or to a box connector 56, the signals are channeled to the correct conductor pairs 81.

The structure of the cable member 77 and the connectors 79 cooperate to enable the enhanced cable assembly 75 to comply with, or exceed, specifications of Category 5E ("Cat. 5E"), also known as Telecommunication Industry Association TIA/EIA-568-B standards. Cat. 5E incorporates the older Category 5 standards which enable cables to carry signals up to 100 MHz, including 100 Base-T and 1000 Base-T signals. Cat. 5E is enhanced from Category 5 with improved "far end" crosstalk performance.

In the illustrated enhanced cable assembly 75, the twist of the conductor pairs 81 is maintained within the cable connector 79 to within one half inch (12.7 mm) of their soldered connection to the solder lugs 136 of the contact members 134. This is illustrated as distance D in FIG. 13. This limitation in the untwisted portion of the conductor pairs 81 within the cable connector 79 improves the crosstalk performance of the cable assembly 75.

Figure 16:
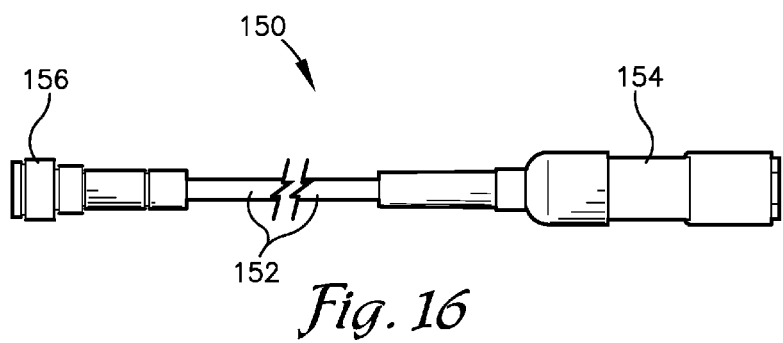
FIG. 16 is a view similar to FIG. 12 and illustrates a modified cable having a U-185 B/G cable connector at one end and a standard type of multi-terminal cylindrical connector at an opposite end.
Figure 17:
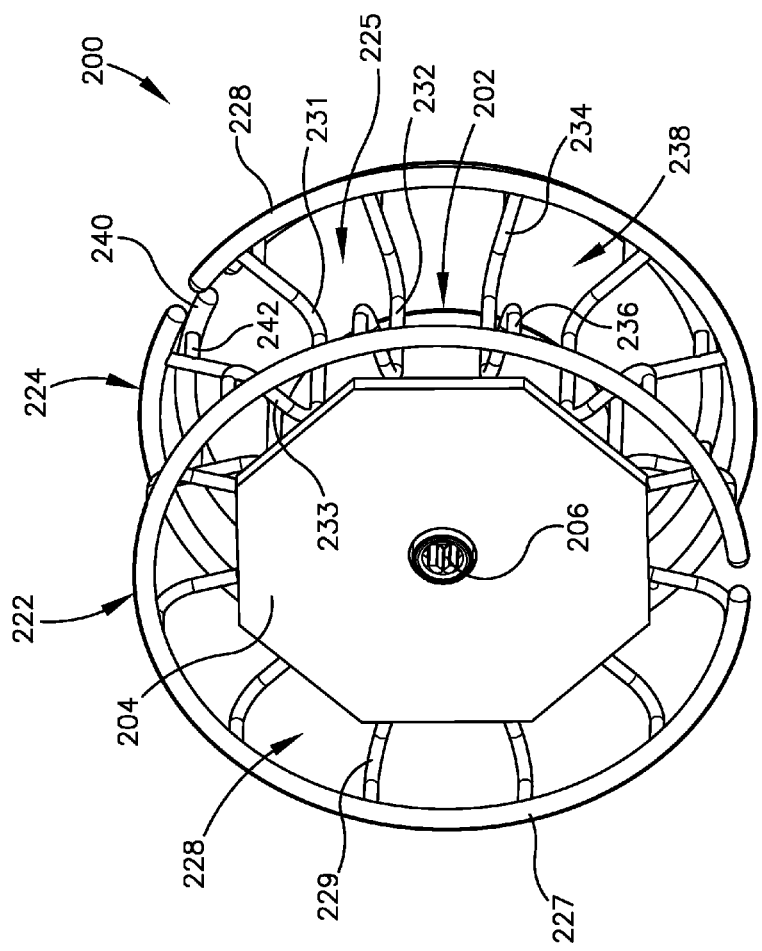
FIG. 17 is a perspective view showing the front of the cable reel and distribution box according to one embodiment.

FIG. 16 illustrates a modified embodiment 150 of the enhanced cable assembly, including a cable member 152 similar to the cable member 77, a cable connector 154 similar to the cable connectors 79 at one end of the cable member 152, and a cylindrical connector 156 at an opposite end of the cable member. The cylindrical connector 156 may be a type of multi-conductor connector designated MS-27467, alternatively designated AE167. Such cylindrical connectors 156 are more compact than the cable connectors 154 for joining two cables 150 having properly gendered versions of the cylindrical connectors 156. The modified enhanced cable assembly 150 complies with, or exceeds, Cat. 5E specifications. In other respects, the cable assembly 150 is substantially similar to the enhanced cable assembly 75.

Figure 18:
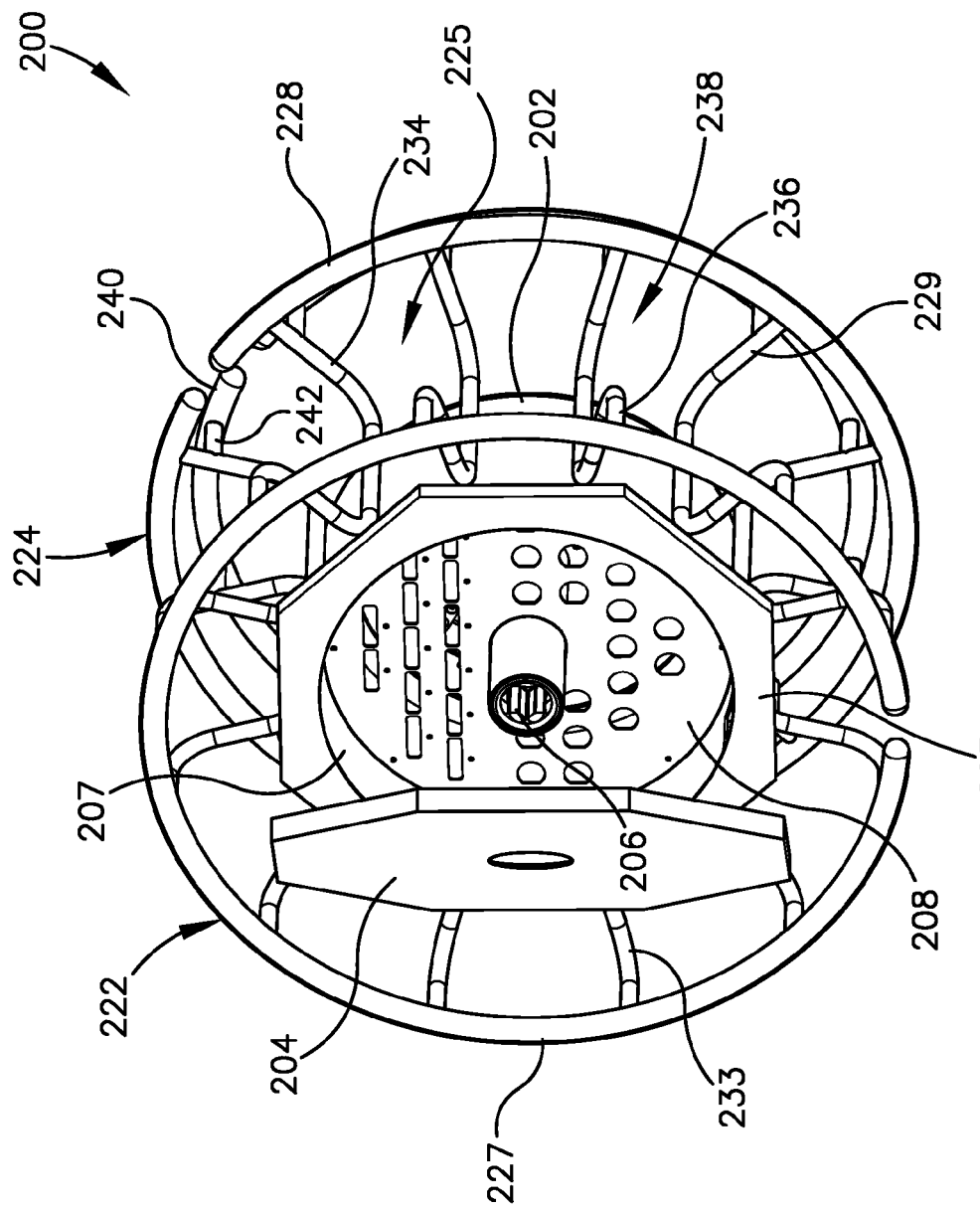
FIG. 18 is a perspective view of the cable reel and distribution box showing the front cover open to expose the connections of the distribution box.

FIGS. 17-23 depict one embodiment of a cable reel assembly 200. The cable reel 200 includes a central reel body, core or hub 202 that defines an axis about which the reel may be rotated. The hub 202 is preferably of hollow construction and serves as a sidewall that, together with an open annular front wall 203, and a rear wall 205 (FIG. 19), cooperatively define an enclosure or containment housing 207, similar to the box 1 previously described. The housing 207 may be provided with one or more gaskets (not shown) to provide a weatherproof enclosure. The front wall 203 of the enclosure 207 is equipped with an access door or cover 204, that is connected by a hinge or other suitable fastener to enable the cover 204 to be easily opened and closed to gain access to the interior of the enclosure 207 (FIG. 18). An arbor hole or axle housing 206 extends coaxially through the enclosure 207, terminating in respective central apertures in the cover 204 and the rear wall 205. The generally tubular axle housing 206 imparts structural integrity and/or strength to the cable reel. The axle housing 206 may further include a plurality of interior projections for engaging a spindle or axle on which the reel may be mounted for rotation.

Figure 23:
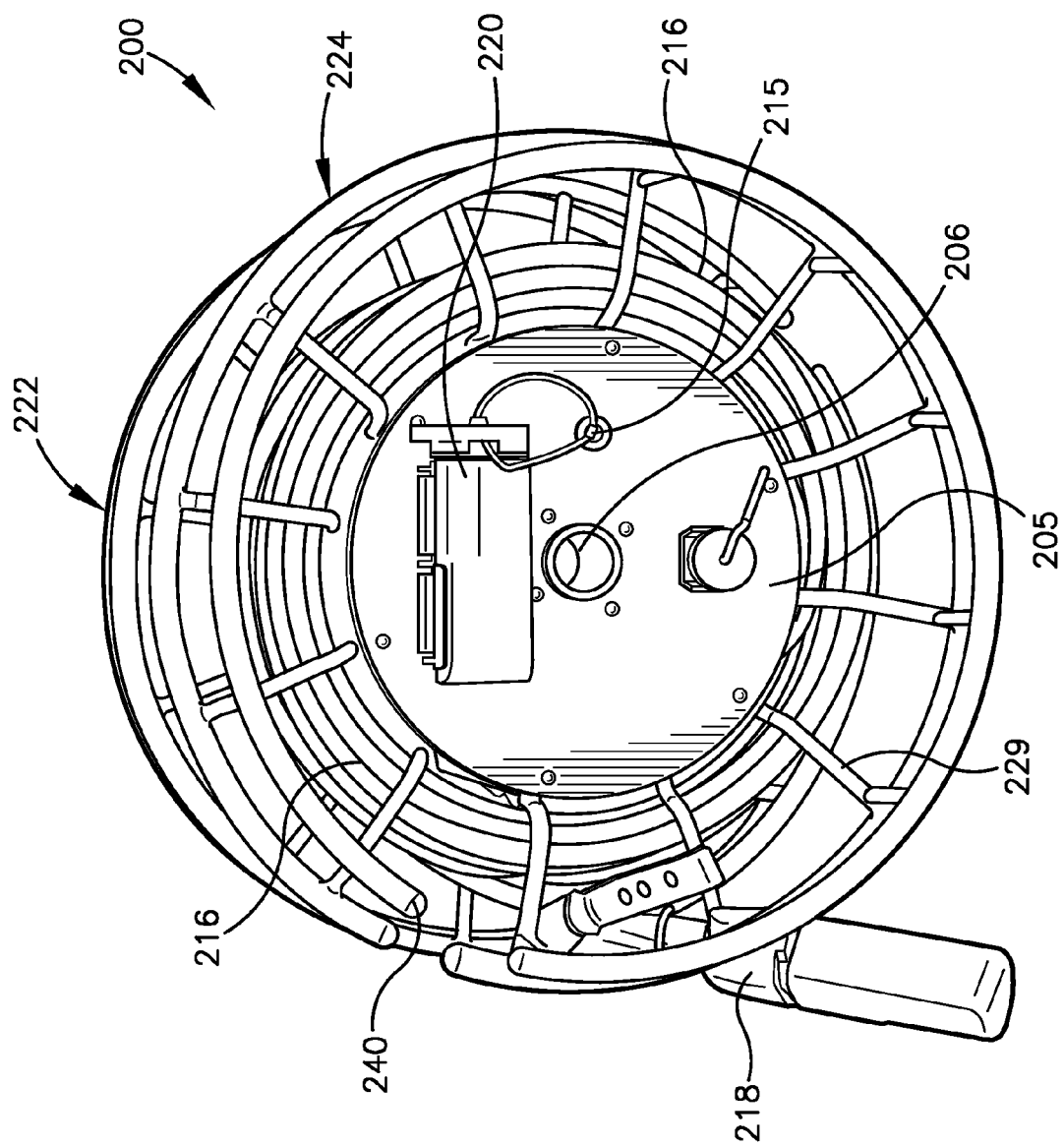
FIG. 23 is a rear plan view of the cable reel and distribution box showing connections of the distribution box according to one embodiment.

In another aspect, the enclosure 207 is configured to contain a modified distribution system therein. As shown, in FIGS. 18, 21, and 22, the modified distribution system is substantially similar to the system previously described, except that the layout for the connection interface has been modified so that it is compatible with the circular cross-section profile of the central enclosure 207. The modified distribution system has a panel 208 that includes six connection jacks 210A-F that are divided into two groups of four-pair Voice over Internet Protocol/Power over Ethernet ("VoIP/POE") jacks. The modified distribution panel 208 also includes a number of insulation displacement connectors (sometimes referred to as Mil-Lok connectors) 212 for phones as well as analog/digital two-pair jacks 214. The rear wall 205 of the enclosure 207 is equipped with a ground lug 215 (FIG. 23). Preferably, the ground lug 215 for the modified distribution system is a U-187 connector and the modified distribution system is intended for use with a twenty-six pair network cable 216, often used in military applications. Typically, the twenty-six pair network cable 216 terminates in a connector 218.

In one embodiment, the connector 218 is a barrel-type connector as shown in FIGS. 21-24. The barrel connector is generally cylindrical in shape and is equipped with pins and a screw ring to hold the male and female ends together. In another embodiment, the connector 218 is a CML connector (made by CML Innovative Technologies). Other suitable connectors may also be employed.

In yet another embodiment, a U-187 connector 220 may be mounted on the rear wall 205 of the enclosure 207. In this embodiment, the U-187 connector 220 may serve as the male counterpart to a female barrel connector that is connected to the end of the cable 216.

Figure 19:
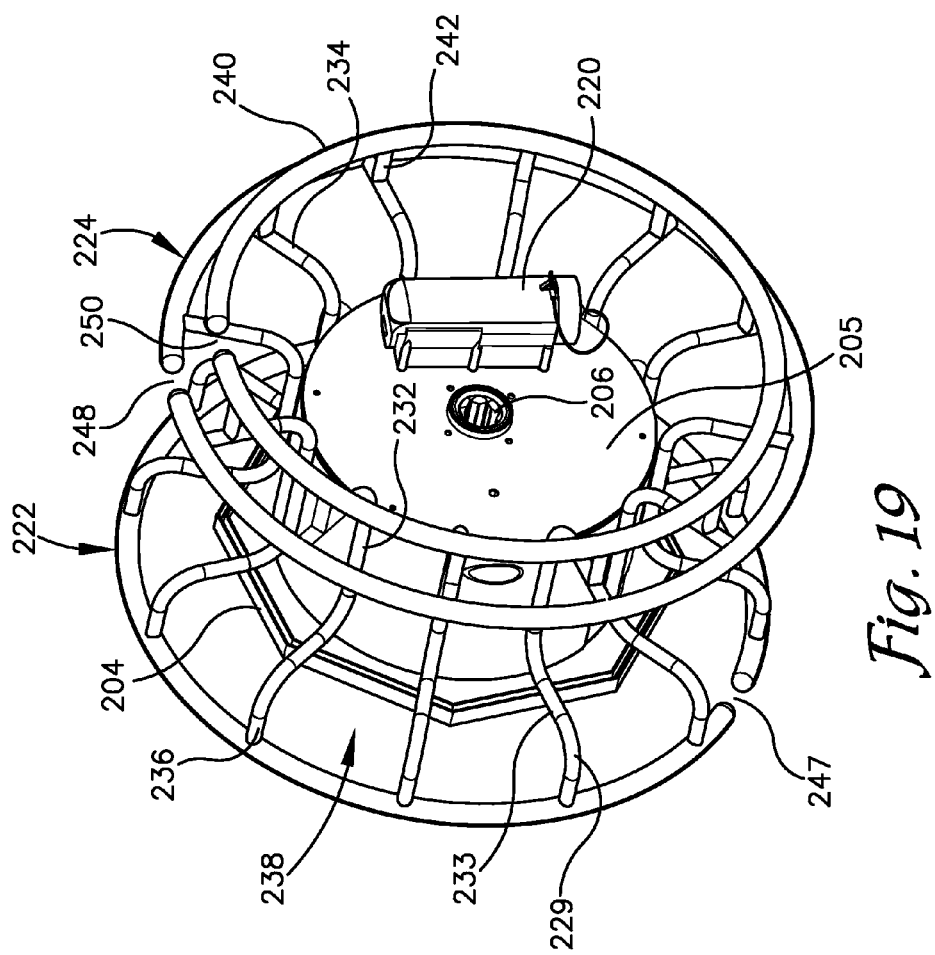
FIG. 19 is a perspective view showing the rear of the cable reel and distribution box according to one embodiment.

In various embodiments, the cable reel also includes front and rear coaxial flanges 222 and 224 of equal diameter projecting outward from the hub 202 in spaced relation to form a cable receiving trough, groove or space 225 between the front and rear flanges 222 and 224. The front and rear flanges 222 and 224 shown are formed from front and rear annular rings 227 and 228 each supported by a plurality of support ribs or spokes 229, which are preferably of tubular construction and project radially outward from the hub 202. In the embodiment shown, the ribs 229 are generally formed from U-shaped support members 231 with a base 232 of each support member 231 connected across the hub 202 and front and rear legs 233 and 234 radially projecting outward. The rear legs 234 of the U-shaped support members 231 support the rear ring 228 and the front legs 233 of the U-shaped support members 231 support the front ring 227. More specifically, the front legs 233 of the U-shaped support members have a forwardly projecting arm 236 formed at an outer end of each front leg 233 on which the ring is mounted. The forwardly projecting arms 236 space the front ring 227 forward of the hub 202 and its front wall 203 and cover 204. The ribs 226 provide strength and support to the flanges 222 and 224, while minimizing the weight of the cable reel 200. In addition, the ribs 226 may define a number of regions 238 that may serve as a handle for grasping the cable reel 200 (FIG. 19). As shown in FIGS. 21-24, cable, such as network cable 216 may be wound around the hub 202, and the distribution system positioned therein, of the cable reel 200 in the trough 225 between front and rear flanges 222 and 224.

In the embodiment shown, the cable reel 200 includes nesting ring 240, that is supported rearward or outboard of the rear flange 224 by tubular supports 242 projecting rearward from the rear legs 234 of the U-shaped support members 231. The nesting ring 240 is coaxial with both the front and rear flanges 222 and 224, and is preferably smaller in diameter and positioned outboard of the rear flange 224 at a preselected distance which is less than the depth of the area extending from the front ring 227 to the cover 204 when closed. Therefore, the nesting ring 240 of a first cable reel 200 may be received within the area defined or surrounded by the front ring 227 forming the front flange 222 of an adjacent, similarly constructed, cable reel 200. This enables two or more cable reels to be securely stacked in nesting relation as shown FIG. 20.

Referring to FIG. 19, each of the flange rings 227 and 228 and nesting ring 240 is discontinuous with a gap 247, 248 and 250 respectively formed therein. Gaps 247 and 248 in the rear flange ring 228 and nesting ring 240 are preferably aligned as shown. When the cable 216 is completely wrapped around the reel 200, the end of the cable 216 proximate the connector 218 can be advanced down through gap 247, gap 248 or gaps 248 and 250 and tucked under the adjacent portion of the respective ring or rings 247, 248 and 259 to help secure the cable 216 in place.

Figure 24:
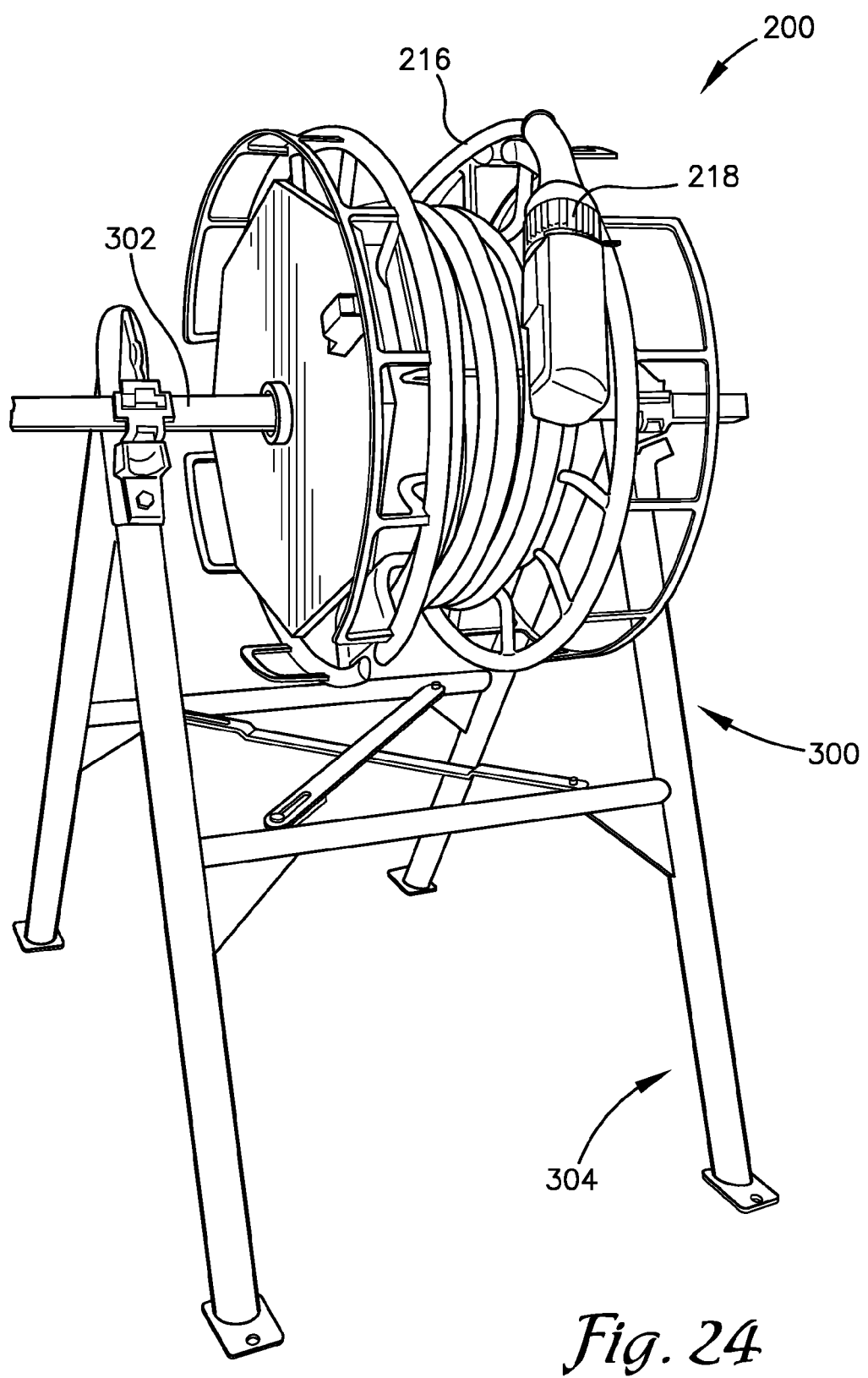
FIG. 24 is a perspective view of the cable reel and distribution box supported on a stand according to one embodiment.

In an embodiment, as shown in FIG. 24, the cable reel 200 may be supported on a cable reel stand 300. The reel stand 300 includes a plurality of ground engaging legs 304 supporting a transverse spindle, shaft or axle 302 received within the axle housing 206. The axle 302 may include a handle or crank at the outboard end thereof, to enable rotation of the reel 200 when the crank is turned and the axle 302 engages the projections inside the axle housing (FIG. 18). The axle 302 may be received within the axle housing 206 when the front cover 204 is positioned in either an open (FIG. 18, 21) or a closed orientation (FIG. 24). Although a reel stand 300 having an A-frame structure is depicted in the drawing figures, other structures and configurations thereof may be employed to support the cable reel 200.

Figure 20:
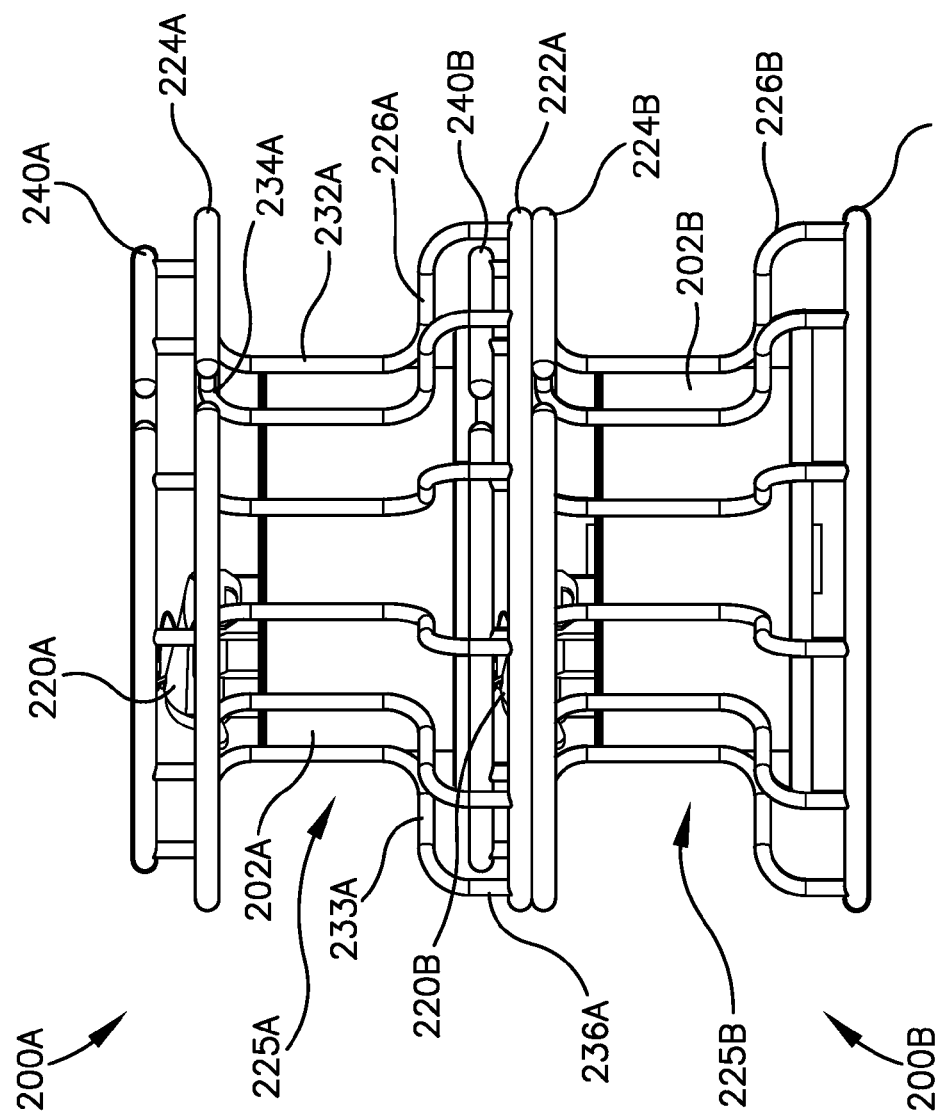
FIG. 20 is a side elevational view of two stacked cable reels according to one embodiment.
Figure 21:
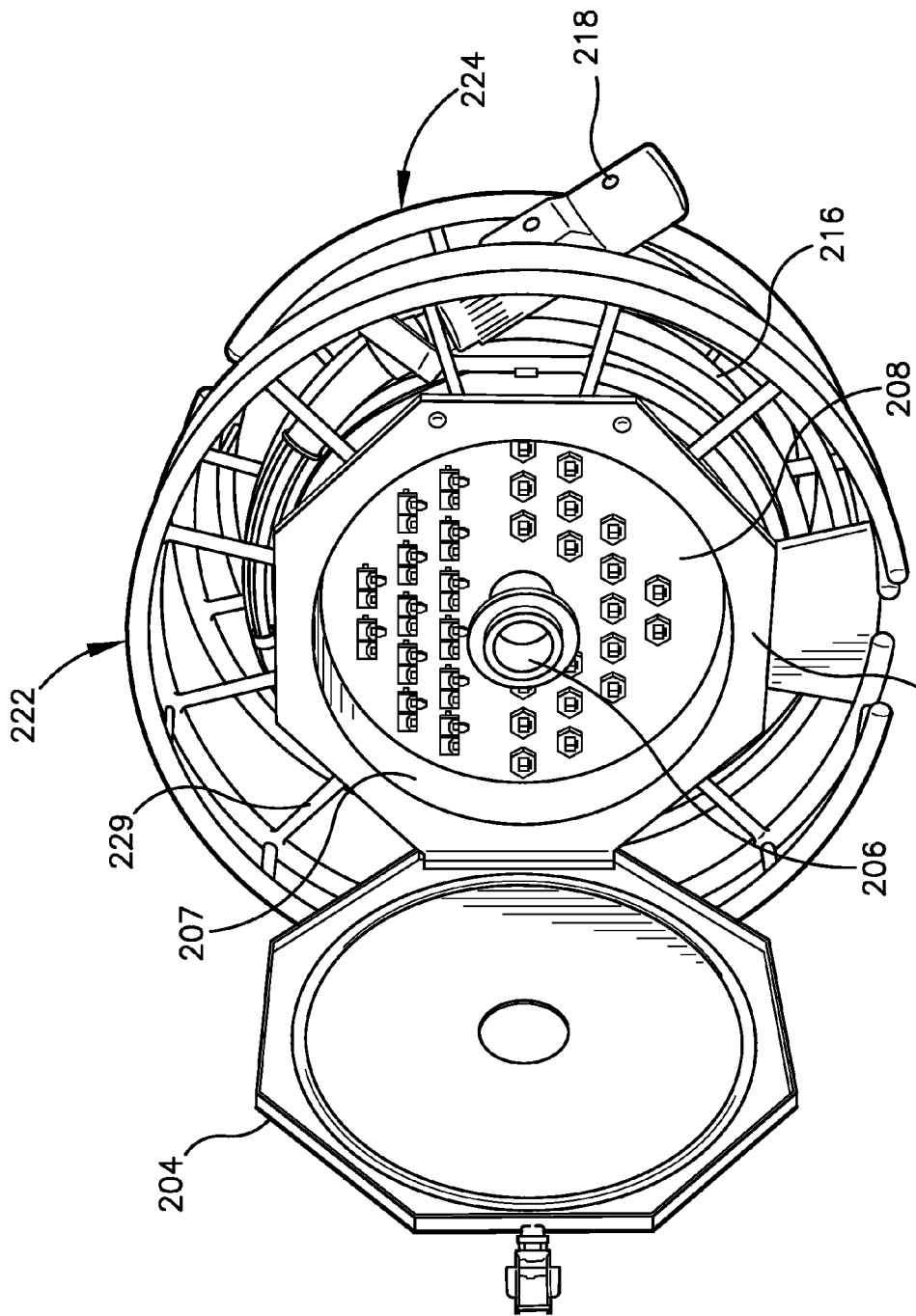
FIG. 21 is a perspective view of the cable reel and distribution box showing the front cover open to expose the connections of the distribution box according to one embodiment.
Figure 22:
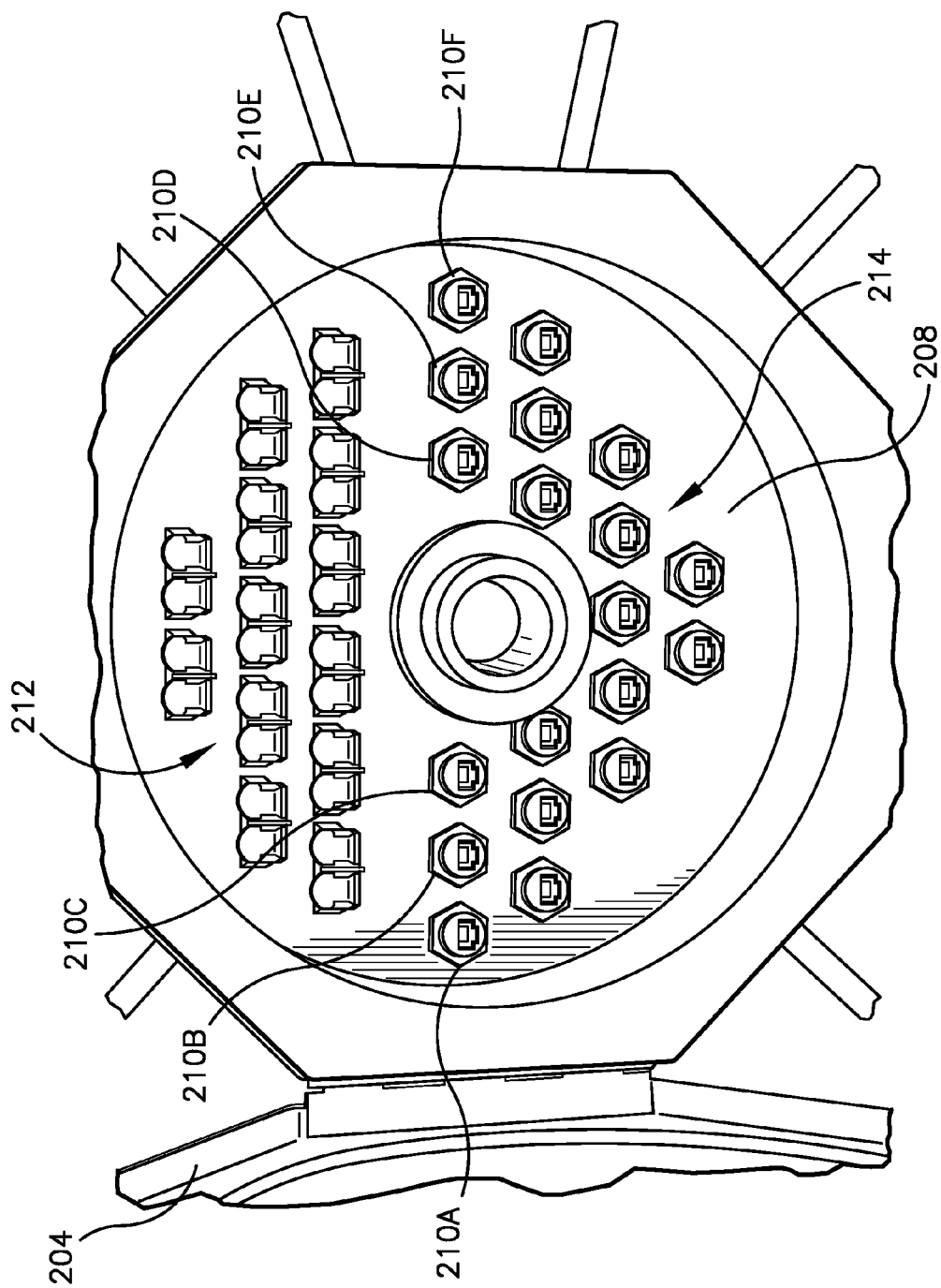
FIG. 22 is an enlarged and fragmentary front plan view showing details of the front of the cable reel and distribution box according to one embodiment.

In use, a pair of cable reels containing a field distribution box 208 may be stacked in a nested relation, as shown in FIG. 20, by positioning a first cable reel 200B in a flat orientation on a support surface such as, for example, the bed of a transport vehicle or the like, with the nesting ring 240B in an upward-facing orientation. A user then moves a second cable reel 200A into a coaxial orientation above the first cable reel 200B with the front flange 222A in a downward-facing orientation. The second cable reel 200A is lowered onto the first reel 200B until the front flange 222A of the second reel 200A matingly engages or abuts the rear flange 224B of the first reel 200B with the nesting ring 240B of the first reel 200B surrounded by the front ring 227A of the second reel 200A so that the two reels 200A and 200B are nested together. A plurality of cable reels may be securely stacked in this manner so that they will not slide off the stack and move about or fall from the vehicle. It is foreseen that the cable reels 200 may also be stacked in an upright position similar to that shown in FIG. 17, or that they may be stacked in a side-by-side orientation with the weight of the reels resting on the flanges 222A, 222B, 224A and 224B, and the nesting rings 240A and 240B in either a right or leftward-facing orientation. It is also foreseen that the reels 200 could be stacked with the nesting rings 240A and 240B in a downward-facing orientation.

When a user debarks from the vehicle, he or she grasps a cable reel 200, lifts it from the stack and rolls or carries the reel to a preselected command post or other field communication area. Advantageously, a single person can remove a cable reel 200, containing both CAT-5E cable and an enclosure 207 containing a field data distribution system, from the transport vehicle and roll or carry the apparatus to a selected area for set up.

It is to be understood that while certain forms of the present invention have been illustrated and described herein, it is not to be limited to the specific forms or arrangement of parts described and shown. Those skilled in the art will appreciate that variations from the specific embodiments disclosed above are contemplated by the invention. The invention should not be restricted to the above embodiments, but should be measured by the following claims.

What is claimed is:

1. A rollable field communication apparatus for use with a cable formed by a plurality of cable conductor pairs to enable temporary connection of communication devices to the conductor pairs, the cable terminating in a cable connector including pairs of terminals for each of the conductor pairs, the apparatus comprising:
    (a) a cable reel having a hollow hub connected at a first end to a first annular flange and at a second end to second and third annular flanges, the third annular flange extending outboard from the second flange, the first and second annular flanges having a first diameter and the third annular flange having a second diameter, wherein the second diameter is less than the first diameter;
    (b) the hub forming a weatherproof housing;
    (c) a panel positioned in said housing and having a plurality of groups of connector devices mounted thereon;
    (d) each of the connector devices including a pair of insulation displacement connectors therein which enable connection thereto of unstripped insulated conductors of a communication device;
    (e) a box connector having a plurality of box conductor pairs, each of the box connector pairs being connected to a respective pair of insulation displacement connectors of one of the connector devices, the box connector being compatible with the cable connector to enable removable connection of the cable to the box connector;
    (f) an electrical data connector mounted on the panel and configured to carry an electrical data signal; and
    (g) an auxiliary connector on the panel and having auxiliary connector terminals connected to the insulation displacement connectors of a selected connector device, the auxiliary connector being of a standard configuration to enable connection of a communication device having a connector compatible with the auxiliary connector to a conductor pair of the cable.

2. An apparatus as set forth in claim 1, wherein the cable reel housing includes:
    (a) an open annular front wall;
    (b) a rear wall;
    (c) a door pivotally connected to the hub in covering relation to the annular front wall.

3. An apparatus as set forth in claim 2, wherein a tubular member extends between the front wall and the rear walls for receiving an axle therethrough.

4. An apparatus as set forth in claim 3, wherein a stand is provided for receiving the cable reel on an axle.

5. A rollable field communication apparatus for use with a cable formed by a plurality of cable conductor pairs to enable temporary connection of communication devices to the conductor pairs, the cable terminating in a cable connector including pairs of terminals for each of the conductor pairs, the apparatus comprising:
    (a) a cable reel having a hollow cylindrical hub connected at a first end to a first annular flange and at a second end to second and third annular flanges, the third annular flange extending outboard from the second flange, the first and second annular flanges having a first diameter and the third annular flange having a second diameter, wherein the second diameter is less than the first diameter;
    (b) the cylindrical hub forming a weatherproof housing;
    (c) a panel positioned in the housing and having a plurality of connector devices mounted thereon;
    (d) each of the connector devices including a pair of insulation displacement connectors therein which enable connection thereto of unstripped insulated conductors of a communication device;
    (e) a box connector having a plurality of box conductor pairs, each of the box connector pairs being connected to a respective pair of insulation displacement connectors of one of the connector devices, the box connector being compatible with the cable connector to enable removable connection of the cable to the box connector; and
    (f) a plurality of auxiliary connectors mounted on the panel, each of the auxiliary connectors having respective auxiliary connector terminals connected to the insulation displacement connectors of a selected connector device, the auxiliary connectors being of standard configurations to enable connection of communication devices having connectors compatible respectively with the auxiliary connectors to selected conductor pairs of the cable.

6. An apparatus as set forth in claim 5, wherein the cable reel housing includes:
    (a) an open annular front wall;
    (b) a rear wall;
    (c) a door pivotally connected to the hub in covering relation to the annular front wall.

7. An apparatus as set forth in claim 6, wherein a tubular member extends between the front wall and the rear walls for receiving an axle therethrough.

8. An apparatus as set forth in claim 7, wherein a stand is provided for receiving the cable reel on an axle.

9. A rollable field communication apparatus for use with a cable formed by a plurality of cable conductor pairs to enable temporary connection of communication devices to the conductor pairs, the cable terminating in a cable connector including pairs of terminals for each of the conductor pairs, the apparatus comprising:

(a) a cable reel having a hollow cylindrical hub connected at a first end to a first annular flange and at a second end to second and third annular flanges, the third annular flange extending outboard from the second flange, the first and second annular flanges having a first diameter and the third annular flange having a second diameter, wherein the second diameter is less than the first diameter;

(b) the cylindrical hub forming a weatherproof housing;

(c) a panel positioned in the housing and having a plurality of connector devices mounted thereon;

(d) each of the connector devices including a pair of insulation displacement connectors therein which enable connection thereto of unstripped insulated conductors of a communication device;

(e) a box connector having a plurality of box conductor pairs, each of the box connector pairs being connected to a respective pair of insulation displacement connectors of one of the connector devices, the box connector being compatible with the cable connector to enable removable connection of the cable to the box connector;

(f) an electrical data connector mounted on the panel and configured to carry an electrical data signal;

(g) an optical connector mounted on the panel and configured to carry an optical data signal; and (h) media converter circuitry coupled between the electrical data connector and the optical connector and bilaterally converting between an electrical data signal received at the electrical data connector to an optical data signal at the optical connector or between an optical data signal received at the optical connector to an electrical data signal at the electrical data connector.

10. An apparatus as set forth in claim 9, wherein the cable reel housing includes:

(a) an open annular front wall;

(b) a rear wall;

(c) a door pivotally connected to the hub in covering relation to the annular front wall.

11. An apparatus as set forth in claim 10, wherein a tubular member extends between the front wall and the rear walls for receiving an axle therethrough.

12. An apparatus as set forth in claim 11, wherein a stand is provided for receiving the cable reel on an axle.

13. A rollable field communication apparatus for use with a cable formed by a plurality of cables, each cable formed by a plurality of cable conductor pairs to enable temporary connection of communication devices to the conductor pairs, the cable terminating in a cable connector including pairs of terminals for each of the conductor pairs, the apparatus comprising:

(a) a cable reel having a hollow cylindrical hub connected at a first end to a first annular flange and at a second end to second and third annular flanges, the third annular flange extending outboard from the second flange, the first and second annular flanges having a first diameter and the third annular flange having a second diameter, wherein the second diameter is less than the first diameter;

(b) the cylindrical hub forming a weatherproof housing;

(c) a panel positioned in the housing and having a plurality of groups of connector devices mounted thereon;

(d) each of the connector devices including a pair of insulation displacement connectors therein which enable connection thereto of unstripped insulated conductors of a communication device;

(e) a plurality of interconnection groups, each interconnection group corresponding respectively with one of the groups of connector devices on the panel and including:

(i) a box connector having a plurality of box conductor pairs, each of the box connector pairs being connected to a respective pair of insulation displacement connectors of one of the connector devices, the box connector being compatible with the cable connector to enable removable connection of the cable to the box connector;

(ii) an electrical data connector mounted on the panel and configured to carry an electrical data signal;

(iii) an optical connector mounted on the panel and configured to carry an optical data signal; and (iv) media converter circuitry coupled between the electrical data connector and the optical connector and bilaterally converting between an electrical data signal received at the electrical data connector to an optical data signal at the optical connector or between an optical data signal received at the optical connector to an electrical data signal at the electrical data connector.

14. An apparatus as set forth in claim 13, wherein the cable reel housing includes:

(a) an open annular front wall;

(b) a rear wall;

(c) a door pivotally connected to the hub in covering relation to the annular front wall.

15. An apparatus as set forth in claim 14, wherein a tubular member extends between the front wall and the rear walls for receiving an axle therethrough.

16. An apparatus as set forth in claim 15, wherein a stand is provided for receiving the cable reel on an axle.

* * * * *